United States Patent [19]
Peterson

[11] Patent Number: 5,167,807
[45] Date of Patent: Dec. 1, 1992

[54] APPARATUS FOR IN-LINE RECOVERY OF PARTICLES FROM A FLOWING FLUID

[75] Inventor: Harold J. Peterson, Merrimac, Wis.

[73] Assignee: DEC International, Inc., Madison, Wis.

[21] Appl. No.: 782,846

[22] Filed: Oct. 24, 1991

[51] Int. Cl.$^5$ .............................................. B01D 29/00
[52] U.S. Cl. ................................. 210/195.1; 210/197; 210/252; 210/435
[58] Field of Search ............... 210/448, 452, 451, 194, 210/453, 195.1, 455, 195.3, 473, 196, 197, 252, 257.1, 258, 348, 416.1, 435, 445, 447, 450

[56] References Cited

U.S. PATENT DOCUMENTS

| | | | |
|---|---|---|---|
| 872,437 | 12/1907 | Leonard | 210/452 |
| 4,300,445 | 11/1981 | Hazen | |
| 4,374,488 | 2/1983 | Peterson | |
| 4,637,879 | 1/1987 | Hartley | 210/448 |
| 4,701,259 | 10/1987 | Rosaen | 210/452 |

OTHER PUBLICATIONS

Arleigh Lee ad for Lee Fines Recovery System, admitted prior art.
Farmers Pride Cheese Equipment ad of Dec. 1981 for Satellite In-Line Fines Recovery System.
Sani-Matic Systems Division ad for wedgewire line strainers, admitted prior art.

Primary Examiner—Frank Sever
Attorney, Agent, or Firm—Quarles & Brady

[57] ABSTRACT

Disclosed herein is a system for continuously removing particles from a flowing liquid and recovering them. In particular, the disclosed preferred embodiment is an application of the invention for the purpose of recovering curd particles from whey in the process of making cheese. The device employs a perforated conduit nested within the conduit bearing the flowing liquid. The liquid passes to the interior of the perforated conduit, leaving the particles moving in a slurry along the outer surface of the perforated conduit. The particle laden slurry encounters a barrier which diverts the flow into a particle recovery pipe.

9 Claims, 3 Drawing Sheets

APPARATUS FOR IN-LINE RECOVERY OF PARTICLES FROM A FLOWING FLUID

BACKGROUND OF THE INVENTION

1. Field of the Invention

The field of the invention is the removal of particles from a flowing fluid.

2. Description of the Related Prior Art

There are a number of applications in which it is desirable to recover certain solids or particles from a flowing liquid because those solids have economic value. For example, it may be desirable to recover seeds, pulp or other matter from flowing juices or other liquid food. Particles may need to be removed from flowing crude oil, gasoline or similar liquid. Additional applications may be found in the paper making and brewing industries. Though the preferred embodiment of the present invention is used in cheese making, the invention is not limited to that industry.

It has long been known to remove particles from a flowing liquid with a mesh strainer set crosswise in the flow of liquid. As the liquid flows through it, particles are deposited on the strainer. Among the disadvantages of this system is the fact that it must be shut down to allow the strainer to be removed and cleaned. It has further disadvantages in applications where it is desired to save and reuse the recovered particles and where maintaining sanitary conditions is crucial. For example, in a food system, the collection of the particles on the screen and manual removal of them may fail to meet the required sanitary standards, and the quality of the retrieved particles sometimes degrades. Further, this apparatus does not lend itself to "cleaning in place" ("CIP"). This refers to food processing systems which can be cleaned by pumping cleaning fluids through it without disassembly.

In addition to such cross-flow strainers, in-line strainers have been developed, primarily to purify liquid as opposed to recover solids. In typical applications, especially in the food industry, such a strainer is a hollow perforated cylinder which is mounted longitudinally within the conduit carrying the particle laden liquid. Often this strainer is covered with a wire mesh overlay. As the liquid flows through the conduit and along the strainer, particles adhere to the cylinder or the mesh overlay. This type of strainer is less susceptible to blowouts than cross-flow strainers and therefore can handle a higher volume of flowing liquid. However, as with the earlier system, it relies on clogging a strainer to purify a liquid, and the line must be shut down and disassembled in order to be cleaned, with the attendant economic and sanitation disadvantages. As with the earlier system, it is ill-suited for economical recovery of particles of marginal value.

In the making of cheese, there has been a particular need for an effective and efficient system to recover and use curd particles (called "fines") found in the whey which is removed during the processing of cheese. Ideally, such a system would meet the following objectives:

(a) continuous in-line recovery of fines from the flowing whey;

(b) simplicity and low cost in relation to the value of the recovered fines;

(c) meeting the sanitary and other requirements of the food industry and the U.S. Food and Drug Administration, the U.S. Department of Agriculture and other regulatory bodies;;

(d) compatibility with C.I.P.;

(e) minimization of degradation or contamination of the quality of the recovered curds.

To make cheese, a mixture of milk, renin, a micro organism and other materials are processed in a vat. The result of each batch consists of chunky curds and more liquid whey. The batch is moved to and allowed to stand in a shallow vat (called a finishing table or a drain table) with a screened drain. The whey flows out of the drain, leaving the vat filled with curds, which eventually becomes the cheese. However, the whey carries "fines" with it.

One method for recovering the fines is to pump the whey into a whey storage tank in which the fines are separated from the whey in a settling process. The long duration of this process results in acid activity and other actions which degrade the quality of the fines so that they can be used only in second line cheeses.

To solve that problem, an in-line system for recovering fines was developed. In that system, the whey draining out of the drain table is pumped across, rather than through, a series of planar mesh screens. This is done under pressure in a liquid filled container from which there is one outlet for the purified whey and another outlet from which a thicker slurry of whey and fines is pumped back to the drain table. This system was unsatisfactory because the screens tended to clog and because it was unable to meet the sanitation requirements of the Food and Drug Administration and the United States Department of Agriculture.

SUMMARY OF THE INVENTION

The invention provides an apparatus for the continuous, in-line removal and recovery of particles from a flowing liquid. The apparatus comprises telescoped conduits for the liquid and a downstream liquid-tight barrier between the two conduits. The liquid flows into an upstream opening of the outer conduit, but not into the inner conduit because it has a closed upstream end. The liquid begins to flow along the outside of the inner conduit, the wall of which is foraminous. Much of the liquid passes into the interior of the conduit through the foramina, leaving a thicker slurry, containing a high concentration of particles, to continue to flow along the outside of the inner conduit. The liquid flowing inside of the inner conduit exits both conduits downstream. The slurry with the particles flowing along the outside of the inner conduit confronts the barrier between the two conduits and exits through another opening in the outer conduit, where it is collected and recycled or preserved for further use.

It will be appreciated that the invention provides a continuous flow system for removing particles from flowing liquid and recovering them for further use. The continuous flow characteristic enhances sanitation and facilitates cleaning in place.

It is an object of the invention to provide an apparatus for the continuous flow removal and recovery of particles from flowing liquid. It is a further object to provide such an apparatus which is suitable for uses, such as with food or blood, in which cleanliness and sanitation is crucial.

These and other objects and advantages of the invention will be apparent from the description which follows. The preferred embodiments will be described in reference to the accompanying drawings. These embodiments do not represent the full scope of the invention, but rather the invention may be employed in other embodiments. Reference should therefore be made to the claims herein for interpreting the breadth of the invention.

DESCRIPTION OF THE PREFERRED EMBODIMENTS

This description of the preferred embodiments is in terms of cheese-making. However, the described preferred embodiments may be used with minor modifications in other applications. In any event, the invention is not limited to cheese making.

Figure 1:
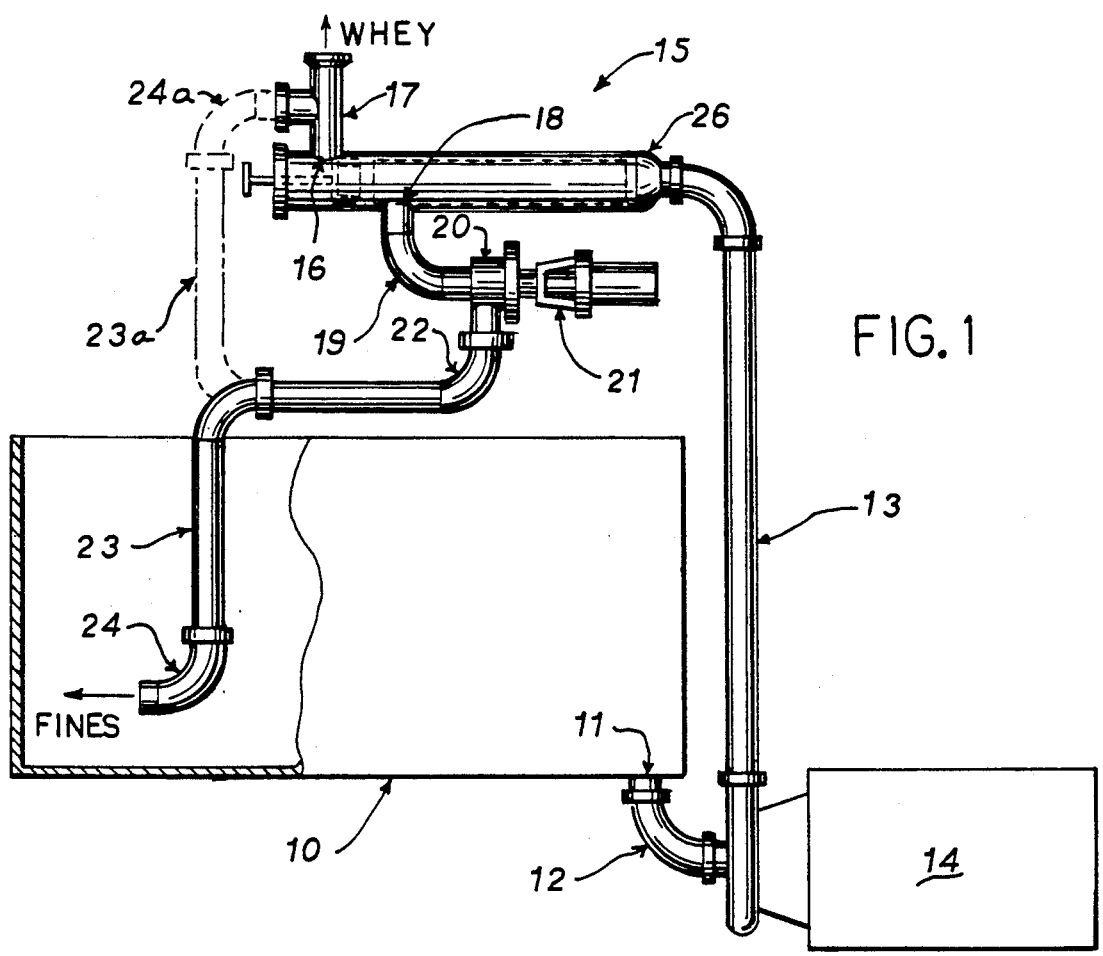
FIG. 1 is a partially diagrammatic side elevational view of an embodiment of the invention in a cheese making application.
Figure 8:
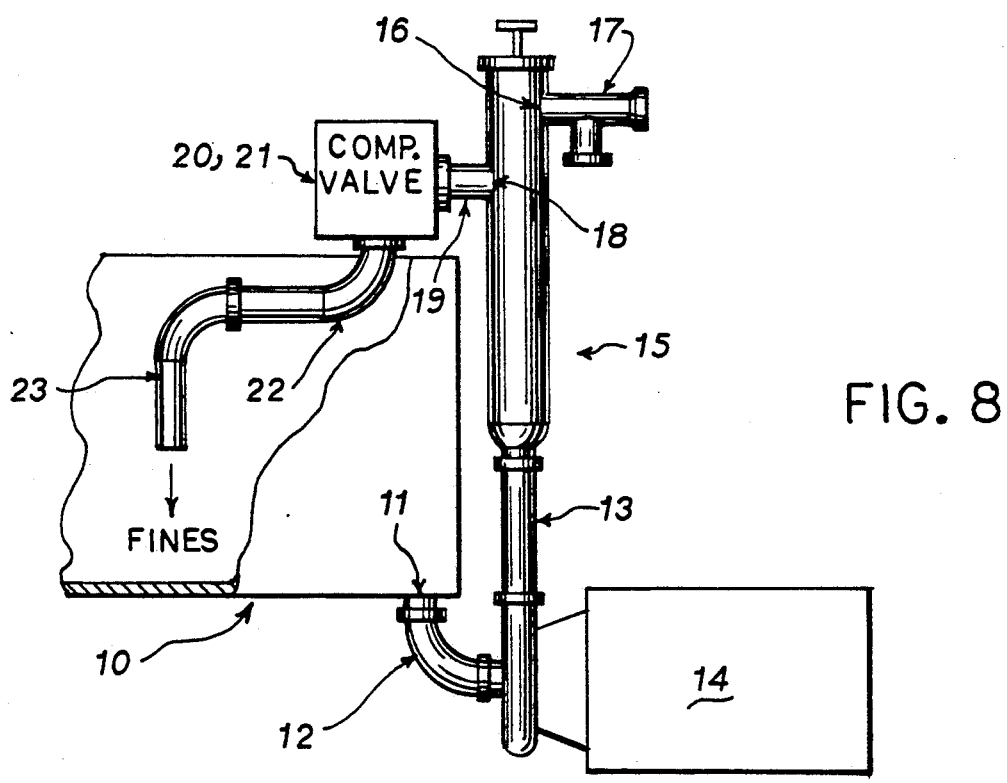
FIG. 8 is an alternative embodiment of the system showing its operation in a vertical position.

Referring to FIG. 1, a conventional drain table 10 is arranged so that liquid whey flows out of the table through drain 11 and pipe 12 into pipe 13, where it is forced upward by pump 14 into the telescoped conduit assembly 15. After passing through the telescoped conduit assembly 15, the whey from which particles have been removed (the "filtered whey") flows away through downstream opening 16 into pipe 17. The removed particles, intermixed with some whey to form a "slurry", flows out of the telescoped conduit assembly 15 through downstream opening or solids recovery port 18 through pipe 19, thence through a conventional compression valve 20-21 (which is used for regulating the flow), through pipes 22, 23 and 24 and back into drain table 10. Pipes 23 and 24 are shown in broken lines as conduits 23a and 24a in their position for cleaning in place.

Figure 2:
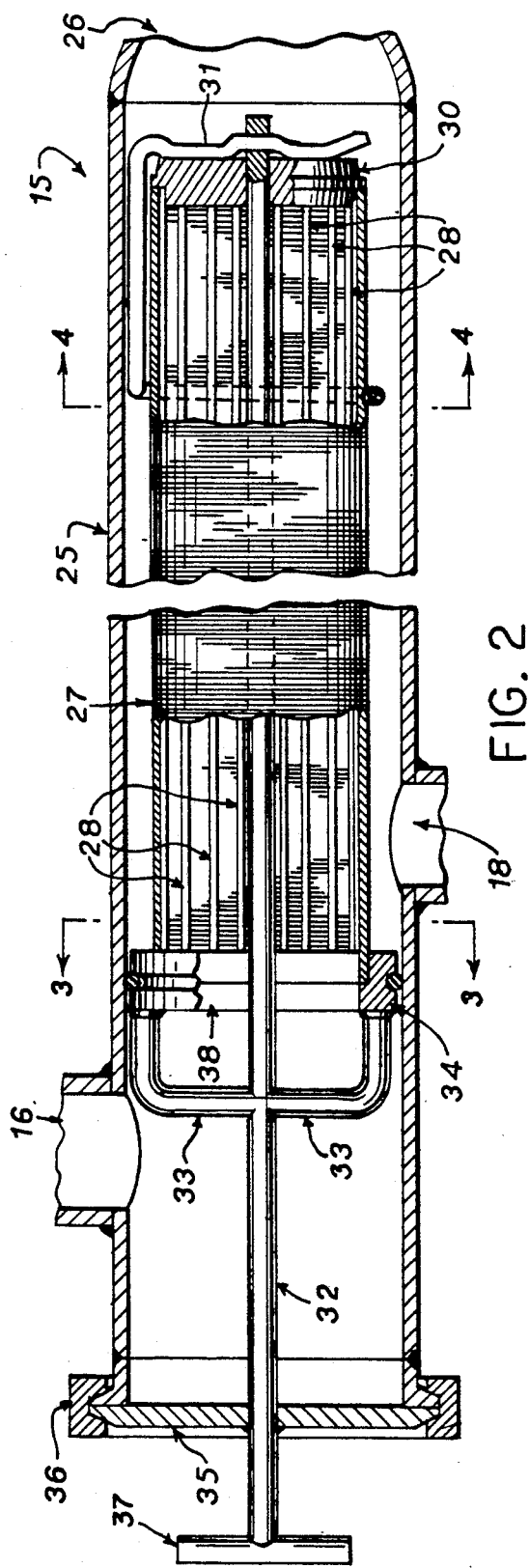
FIG. 2 is a partial longitudinal cross section view of the telescoped conduit portion of FIG. 1.

The details of telescoped conduit assembly 15 are shown in FIG. 2. One component of the assembly is outer conduit 25. It has an upstream opening 26 which receives whey from pipe 13 (which is shown in FIG. 1). If the inner conduit 27 were not present, the whey would flow out of outer conduit 25 through downstream openings 16 and 18. These openings are made to mate with pipes 17 and 19 (shown in FIG. 1) respectively.

Figure 4:
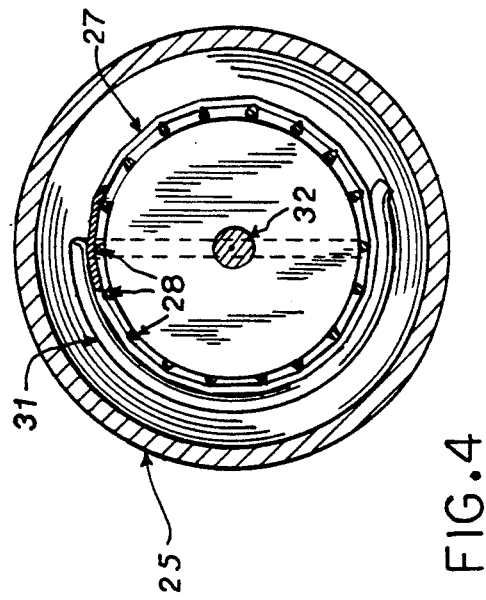
FIG. 4 is a lateral cross section view of the telescoped conduits of FIG. 2 taken on line 4—4 of FIG. 2.
Figure 3:
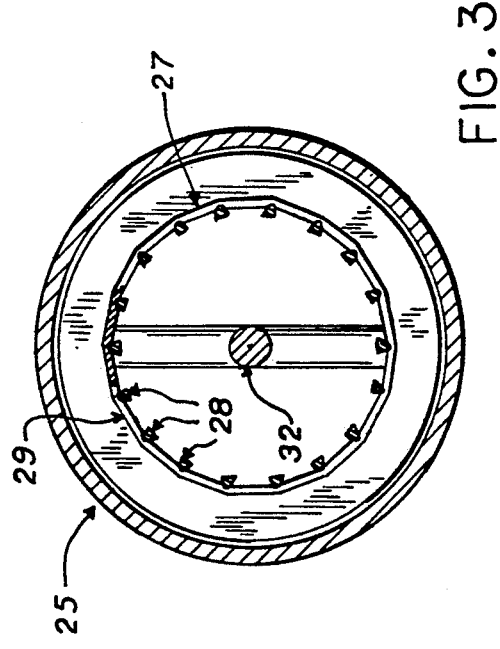
FIG. 3 is a lateral cross section view of the telescoped conduits of FIG. 2 taken on line 3—3 of FIG. 2.
Figure 5:
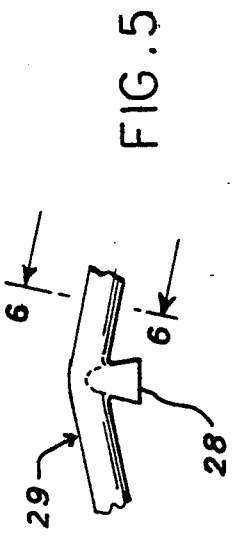
FIG. 5 is an enlarged partial view of the cross section of FIG. 3.
Figure 6:
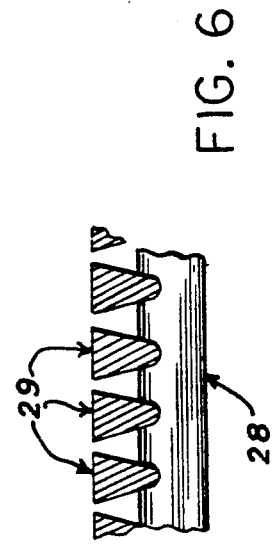
FIG. 6 is a partial longitudinal cross section view of the interior conduit taken on line 6—6 of FIG. 5.

Inner conduit 27 is made of longitudinal rods 28 around which a wire having a triangular cross section is wound in a coil, thereby forming a cylinder. (Though shown in FIGS. 3 and 4 as an approximately circular cylinder in the preferred embodiment, the inner conduit need not be a circular cylinder.) As shown in FIG. 3, the cylindrical structure of inner conduit 27 is established longitudinally by rods 28 and laterally by the coil of wire 29. (The coil of wire 29 is shown in FIG. 2 by the pattern of closely spaced vertical lines.) FIG. 5 shows a typical joint of rod 28 and wire 29. As shown in FIG. 6, rod 28 has a pattern of equally spaced notches which match the triangular shape of wire 29. In the preferred embodiment, each such joint is soldered.

Inner conduit 27 is closed at its upstream end by plug 30, which is held in place by lock pin 31. Inner conduit 27 is hollow and has an opening 38 at its downstream end.

Referring to FIG. 2, inner conduit 27 is held suspended within outer conduit 25 by frame rod 32, frame arms 33 (which are attached to 0 ring 34 which abuts the inner surface of outer conduit 25), lock pin 31 and by outer conduit plug 35, which is rigidly attached to frame rod 32 and to outer conduit 25 by clamp 36. If clamp 36 were removed, the entire inner conduit 27 could be removed for maintenance by pulling on handle 37.

In operation, the whey flows from drain table 10 into upstream opening 26. Plug 30 prevents the whey from entering inner conduit 27. Accordingly, it is forced to flow over inner conduit 25 and therefore over the rectangular slots or foramina formed by the interstices between wire 29 windings and rods 28. Much of the whey passes through those slots and flows through the interior of inner conduit 27 and out of its downstream opening 38 and out of outer conduit 25 through its downstream opening 16. Some of the whey and much of the curd particles (the "slurry") flow between the outer surface of inner conduit 27 and the inner surface of outer conduit 28 until they reach 0 ring 34. This slurry flows out of outer conduit 25 through its solids recovery port 18. From there it follows the path 19, 20, 22, 23, 24 (shown in FIG. 1) to be deposited back into drain table 10. The operator will adjust the compression flow valve to achieve the driest slurry possible without causing clogging. It has been found that best results are achieved if the path of the slurry is a falling path, with no rises.

In the preferred embodiment shown in the drawings, outer conduit 25 is 36 inches long and has a diameter of 4 inches. Inner conduit 27 is 30 inches long, has a diameter of 3 inches, uses 18 equally spaced rods 28, and has about 15 turns of wire 29 per inch. At the outer surface of inner conduit 27, wire 29 is approximately 0.04 inches wide and the space between the turns is about 0.02 inches. The interstices of the wire 29 and rods 28 form the equivalent of a 0.060 mesh. Wire and spacing of different dimensions may be chosen, depending on the size of the particles to be recovered, speed of the flow and other factors. A typical flow rate through this embodiment of the invention is 60,000 pounds per hour.

Figure 7:
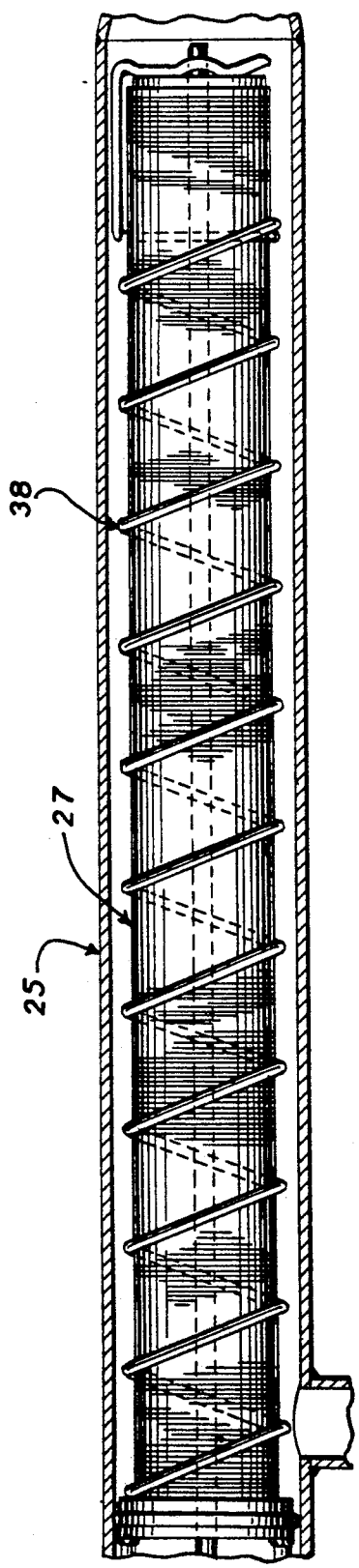
FIG. 7 is a longitudinal cross sectional view of the telescoped conduits of an alternative embodiment.

FIG. 7 shows an alternate embodiment in which a strand of bendable, but otherwise rigid, material (such as a stiff wire) is wound in a loose coil around inner conduit 27. It has been found in practice that good results are achieved in the cheese making process if the distance between each winding of this coil is approximately 1/10 the length of inner conduit 27. It is thought that coil 38 creates a turbulence which helps to minimize clogging of curd particles on the surface of inner conduit 27.

In cheese making, conduits 25 and 27 and pipes and connections are made of stainless steel. Other conventional materials may be used in other applications.

As can be seen from the preceding description, the present invention meets the need for a simple and economical system of continuously separating and recovering particles from a flowing liquid and doing so in a way which is consistent with maintaining sanitary conditions and compatibility with C.I.P. The preferred embodiment has operated to recover 18 lbs. of fines per 30,000 lb. batch of milk which yields 3,000 lbs. of curds.

Although preferred embodiments of the invention have been described above, the invention claimed herein is not restricted to that embodiment. In this regard, there may be various other embodiments and changes to the described embodiments which are within the scope of this invention. The invention is not to be limited by the specific description above, but should be judged by the claims which follow.

I claim:

1. An apparatus for continuous in-line recover of solid particulates suspended in a flowing fluid, the combination comprising:
   (a) a conduit having a wall with an exterior surface and an interior surface defining a hollow interior, an inlet opening to said hollow interior adapted to receive a flow of fluid with solid particulates to be recovered suspended therein, an outlet opening from said hollow interior remote from said inlet opening from which the fluid can flow freely, and a continuously open solids recovery port through said wall of said conduit remote from said inlet opening;
   (b) a cylindrical member with a hollow interior and with a foraminous wall with foramina sized to block flow of solid particulate to be recovered mounted in said hollow interior of said conduit and spaced from said interior surface of said conduit wall to define a flow space between said foraminous wall and said interior surface of said conduit wall, said hollow interior of said cylindrical member having an end adjacent said inlet opening of said conduit blocked to prevent flow of fluid containing solids into said hollow interior and to direct inlet flow of fluid containing solid particulate to be recovered into said flow space, and said foraminous wall at an end of said cylindrical member remote from said inlet opening being sealed to said interior surface of said conduit wall to block flow out of said flow space;
   (c) said flow space communicating with said solids recovery port in said conduit proximate to said end of said foraminous wall sealed to said interior surface of said conduit wall to allow continuous recovery of solid particulate trapped in said flow space; and,
   (d) said hollow interior of said cylindrical member communicating with said outlet opening in said conduit to allow fluid separated from said solid particulate to flow freely out of said hollow interior and said conduit.

2. The apparatus of claim 1 wherein an encircling wire is wound in a loose helix around the cylindrical member and within the conduit.

3. An apparatus for continuous in-line removal of particles from a flowing liquid, which apparatus comprises:
   (a) an outer conduit with a hollow interior, which outer conduit has an upstream opening to accept particle-bearing liquid which flows into the outer conduit, a continuously open first downstream opening to allow the outflow of particles separated from the liquid and further downstream a second downstream opening to allow the outflow of liquid from which particles have been separated ("strained liquid");
   (b) an inner conduit with a hollow interior, which inner conduit is nested within the outer conduit, and similarly aligned as to flow as the outer conduit, and which extends downstream beyond the first downstream opening, which inner conduit has (1) a smaller cross sectional area than the outer conduit so that there is a flow space between the inner surface of the outer conduit and the outer surface of the inner conduit, (2) a closed upstream end, (3) a wall with perforations over which wall the particle-bearing liquid begins to flow at the upstream end, the perforations of the wall being sized to block the flow of particles to be recovered and to allow the strained liquid to flow into the interior of the inner conduit, and (4) an opening located downstream of the first downstream opening to allow the outflow of strained liquid;
   (c) a barrier which is located between the first and the second downstream openings and which sealably extends between the outer surface of the inner conduit and the inner surface of the outer conduit.

4. The apparatus of claim 3 wherein the foramina of the inner conduit are approximately rectangular in shape.

5. The apparatus of claim 3 wherein the inner conduit comprises:
   (a) a plurality of bars which are rigid and are arranged longitudinally to define the cross sectional shape of the inner conduit;
   (b) a wire wound around the bars in a helix form and rigidly attached to the bars to form the wall with perforations, a perforation being defined by an adjacent pair of bars and adjacent turns of the wire.

6. The apparatus of claim 5 wherein the cross sectional shape of the wire is approximately triangular.

7. The apparatus of claim 3 wherein the inner conduit comprises:
   (a) a plurality of bars which are rigid and are arranged longitudinally to define the cross sectional shape of the inner conduit;
   (b) a plurality of bands of wire, each of which band is rigidly attached to the bars to form the wall with perforations, each perforation being defined by an adjacent pair of bars and an adjacent pair of bands.

8. The apparatus of claim 7 wherein the cross sectional shape of the wire is approximately triangular.

9. The apparatus of any of the preceding claims 2 through 7 wherein an encircling wire is wound in a loose helix around the inner conduit and within the outer conduit.

* * * * *